Figure 1:
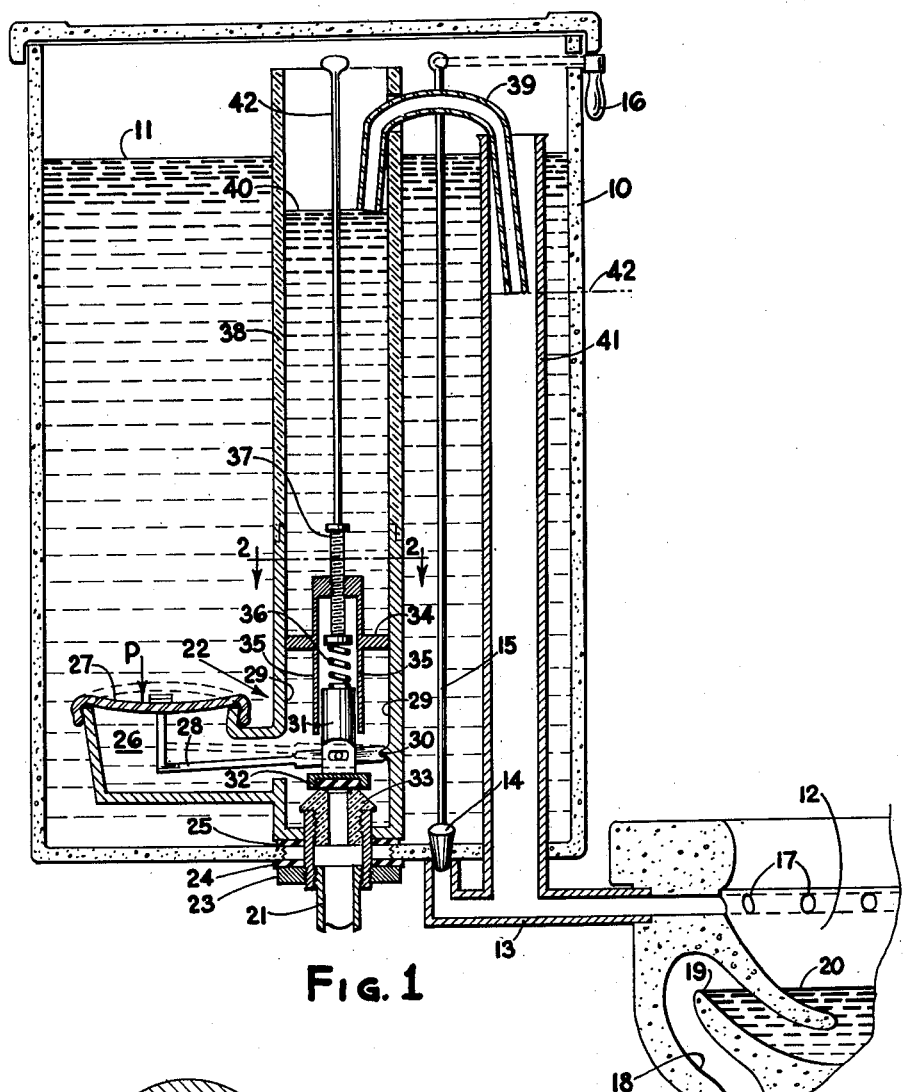

Sept. 17, 1957   W. J. MacCAULEY ET AL   2,806,483
VALVE CONTROL APPARATUS FOR USE IN FLUSH TANKS
Filed Nov. 17, 1955

INVENTORS
WILBUR J. MacCAULEY
NORMAN C. PARRISH
BY Elliott & Pastoriza
ATTORNEYS

United States Patent Office

2,806,483
Patented Sept. 17, 1957

2,806,483

VALVE CONTROL APPARATUS FOR USE IN FLUSH TANKS

Wilbur J. MacCauley, Northridge, and Norman C. Parrish, Redondo Beach, Calif., assignors to Helco Products Corporation, a corporation of California Application November 17, 1955, Serial No. 547,422

5 Claims. (Cl. 137—403)

This application is a continuation in part of our co-pending application, Serial Number 533,477, filed September 9, 1955, now abandoned, and entitled Valve Regulating Apparatus for Use in Flush Tanks. The instant invention relates particularly to an improved pressure responsive valve means for controlling the liquid level in conventional toilet flush tanks.

Present day flush tanks usually include a float operated valve for admitting water to the flush tank after the flushing operation has been completed. These float valves generally comprise a relatively large spherical brass ball secured to one end of an elongated pivoted arm. The opposite end of the arm is connected to an inlet valve adapted to open upon lowering of the float ball. Opening of the valve admits water under pressure into the tank, and as the water level rises in the tank, the float valve is buoyed upwardly with a resultant gradual closing off of the inlet valve. When a certain level is reached by the float ball, the valve is completely shut off. Subsequent draining of the tank results in the float ball falling by gravity to again open the valve and admit water for filling the tank.

In float valves of the above described type, the float ball must be capable of traveling between the upper and lower limits of the water level in the tank. To accommodate this relatively large vertical movement, the lever arm connected to the float ball must necessarily be long, and must be pivoted at a relatively large distance above the bottom of the tank. As a consequence, the pivot mechanism and valving structure is exposed to the atomsphere during a substantial period of the filling operation when water enters the tank and as the valve is gradually closed off.

Aside from the noise problem, a more serious difficulty as a result of exposure to the atmosphere of the float valve mechanisn, is the corrosion that takes place over long periods of time. The floating ball, for example, will always have a portion above the water level and a portion below the water level, while the relatively long lever arm itself will enter and leave the water during operation of the apparatus. In addition to a general corroding action, the exposure to the atmosphere of the various parts after submersion in the water subjects them to the possibilities of electrolytic reactions with impurities in the water. These conditions as a result of intermittent exposure and submersion of the parts may, after long periods of time, damage and eventually destroy the mechanism. Further, the float ball itself may corrode to cause a leak and consequently sink to render the apparatus inoperable.

Bearing the above in mind, it is a primary object of the present invention to provide an improved valve regulating apparatus for flush tanks which obviates the above noted difficulties.

More particularly, an object is to provide an improved valve regulating apparatus which is smaller and more rugged than conventional valves and which is extremely quiet in operation.

Another important object is to provide a valve mechanism which is so installed that it is always submerged whereby none of its moving parts are exposed to the atmopshere so that electrolytic action and corrosion of the moving parts are minimized.

Still another important object of this invention is to provide a substitute valve regulating apparatus for the conventional float valve, which may be readily installed in conventional toilet flush tanks with a minimum of modification in the tank structure.

Yet another object is to provide a valve regulating apparatus which may be readily adjusted to control the level of liquid in the tank to any desired value.

These and other objects and advantages of the present invention are attained by providing a body member adapted to be secured to the bottom of a conventional flush tank over the normal water source inlet pipe. This body member includes a cavity, one wall of which comprises a flexible diaphragm, whereby the upper surface of the diaphragm and cavity are subject to the static pressure or head of water in the tank. The body member further includes a vertical cylindrical section laterally communicating with the cavity at its lower end and opening into an upstanding pipe at its upper end. The pipe passes from the top opening of the cylindrical section up through the tank above the normal water level therein. The underside of the diaphragm in the cavity is subjected to a static water pressure as a result of water in the upstanding pipe and cylindrical section.

The cylindrical section of the body co-axially surrounds a valve seat in axial alignment with the liquid inlet source passing into the bottom of the tank. A valve head and associated stem are adapted to move back and forth within this cylindrical section in response to an actuating means in the form of a pivoted lever arm coupled to the valve stem and connected at one end to the diaphragm of the cavity. Changes in the static water pressure on each side of the diaphragm thus serve to lift or lower the valve head with respect to the valve seat A biasing spring within the cylindrical section normally holds the valve head on the valve seat in aiding relationship with respect to the static pressure on the upper side of the diaphragm.

When the tank is drained, the static water pressure on the upper side of the diaphragm is decreased but the water pressure on the underside due to the column of water in the cylindrical section and upstanding pipe does not change. This underside pressure combined with the water pressure in the inlet line is sufficient to overcome the force of the compression spring and open the valve to admit water into the cylindrical section and upstanding pipe. The water overflows from the top of the upstanding pipe to fill the tank. As the tank fills, the static pressure above the diaphragm increases until its combined effect together with the force of the compression spring is sufficient to close the valve. The effectiveness of the compression spring within the bore may be varied whereby the static head or liquid level in the tank may be adjusted.

The cavity, valve apparatus, and spring are at all times submerged in water so that none of the moving parts are exposed and their operation is relatively silent.

Figure 2:
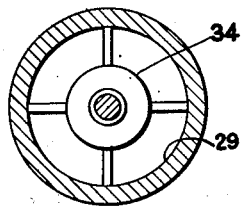

A better understanding of the invention will be had by referring to the accompanying drawings, in which:

Figure 1 is an elevational view, partly in cross section of a conventional flush tank and toilet bowl incorporating the improved valve regulating apparatus of this invention, and Figure 2 is a plan view of a portion of the apparatus taken in the direction of the arrows 2—2 of Figure 1.

Referring to Figure 1, there is shown a conventional flush tank 10 filled with liquid to a given level 11. A conventional toilet bowl 12, to the lower right of the tank, is arranged for communication with the bottom of the tank through a pipe 13 normally closed by a conventional cone valve 14 secured to a stem 15 passing upwardly through the tank. The upper end of the stem 15 is arranged to be lifted by a flush handle 16. The upper inside periphery of the bowl 12 is provided with a series of openings 17 communicating with the pipe 13 for passing water from the tank into the bowl. Water in the bowl flushes out a drain pipe 18 which includes an upturned portion 19 communicating with the bottom portion of the bowl 12 to provide the conventional gas trap as is well known in the art. A normal water level, as indicated at 20, is maintained in the bowl 12. The source of water for the flush tank is provided through an inlet conduit 21 passing into the bottom of the tank 10 through the improved valve apparatus of the present invention.

As shown, the valve regulating mechanism comprises a body member 22 secured over the inlet conduit 21 to the bottom of the tank 10 by means of a nut 23 and sealing washers 24 and 25. The left hand portion of this body member includes a cavity 26 having its upper wall in the form of a flexible diaphragm 27. The under central portion of the diaphragm is secured to one end of a lever arm 28, the other end of which passes into a cylindrical section 29, in the right hand portion of the body 22. This far end of the lever arm is pivoted to the far wall as at 30. The cylindrical section 29 is axially aligned over the inlet conduit 21.

The lever arm is linked adjacent the pivot point 30 to a valve stem 31 within the cylindrical section 29, terminating in a valve head 32 adapted to seat on a valve seat fitting 33 at the upper end of the inlet conduit 21. Preferably the valve head includes an insert of rubber material adapted to sealably engage the valve seat 33. This seat has an annular upper lip preferably rounded and of a plastic material such as "teflon" for good sealing and wearing characteristics. The construction is such, however, that the valve seat may be changed by simply unthreading the same and inserting a new fitting.

As shown in both Figures 1 and 2, the cylindrical section above the valve head includes a spider structure 34 having downwardly directed guide rails 35 for guiding movement of the valve stem 31 in an axial vertical direction. A compression spring 36 is positioned within the guide rails between the upper end of the valve stem and the end of an adjusting screw 37 threaded through the top portion of the spider 34 as shown. By threading the screw through the spider, to axially compress or lengthen the spring, the force exerted by the compression spring on the valve stem and head may be varied.

The upper end of the bore 29 is threadedly connected to an upstanding pipe 38 preferably made of plastic material. As shown, this pipe passes upwardly through the tank above the normal water level 11. An overflow fill tube 39 passes from a level 40 a short distance below the top of the pipe 38, out the pipe 38 and into a conventional overflow pipe 41, the tube terminating at a level 42 below the level 40 in the pipe 38. If desired, the tube could pass directly from the pipe 38 into the overflow pipe 41 at the level 42, but this arrangement would necessitate boring an opening in the pipes and providing water-proof fittings therefover. The simple overflow fill tube is preferable in order to minimize structural changes in conventional components already present.

In operation, when the flush tank is filled to the liquid level 11 as indicated in Figure 1, the static pressure on top of the diaphragm as indicated by the arrow P, together with the force of the spring 36 is sufficient to hold the diaphragm 27 in its solid line position thus maintaining the valve head 32 on the valve seat 33 and preventing water from entering the flush tank. When the handle 16 is operated to unseat the cone 14 and permit the flush tank to drain into the toilet bowl 12, this static pressure of water in the tank decreases, thus relieving the pressure on the diaphragm 27 and permitting the valve head and diaphragm to move upwardly towards the dotted line position. Movement to this position is the result of two forces: first, the water inlet pressure in the conduit 21 acting upwardly against the valve head, and, second, the water pressure on the inside of the cavity and under the diaphragm as a result of the head of water at the level 40 in the pipe 38. These combined forces rotate the lever arm 28 about the pivot means 30 in a clockwise direction, and thus raise the valve stem 31 to the dotted line position. The raising of the valve stem to this position to unseat the valve seat 33, permits water from the inlet conduit 21 to flow into the cylindrical section 29 and to raise the level of the water in the section and the upstanding pipe 38. A portion of this water passes out the overflow fill tube 39 to flow into the overflow pipe 41 and drain through the conduit 13 and opening 17 into the toilet bowl 12, thereby sealing off the toilet bowl against gases from the drain pipe.

When the pipe 38 is filled with water, it will overflow and commence filling the tank 10. The increased static pressure of the water in the upstanding pipe as a result of the filling up of the pipe will be acting on the lower side of the diaphragm 27 in the cavity 26 to hold the diaphragm in the dotted line position and thus maintain the valve on the inlet conduit 21 open against the force of the compression spring. As the tank fills from water overflowing over the top of the pipe 38, however, the pressure on the upper side of the diaphragm will gradually increase until it balances the underside pressure due to the column of water in the pipe 38. The combined effect of the spring 36 and the outside water pressure on the top of the diaphragm 27 is then sufficient to seat the valve head on the valve seat and prevent water from continuing to enter the cylindrical section 29 and pipe 38.

The overflow fill tube 39, however, is still filled with water, and since its right hand end within the overflow pipe 41 is lower than its left hand end in the upstanding pipe 38 at the level 40, water will siphon through the tube 39 from the pipe 38 until the water level in the pipe 38 reaches the level 40. As the water siphons from the pipe 38, the water pressure exerted on the underside of the diaphragm 27 in the cavity 26, is correspondingly reduced thereby resulting in a greater differential between the pressure P on top of the diaphragm 27 and the under pressure, resulting in a further urging downwardly of the valve head 32 on the valve seat 33 through the action of the lever arm 28. After the water has been siphoned out of the upstanding pipe 38 to the level 40, the tank is in condition for subsequent flushing, at which time the process as described above is repeated.

In accordance with a feature of the invention, the normal water level 11 within the tank 10 may be varied by adjusting the effectiveness of the compression spring 36. As mentioned, the compression force exerted by the spring 36 may be varied by threading down the screw 37 to compress the spring, or alternatively, unthreading the screw 37 to lengthen the compression spring and thus render its force less effective. An elongated rod 42 connected to the screw 37 may be provided for easy manual turning thereof from the surface.

By screwing down the screw 37 to increase the effective force of the spring 36, the normal tank water level 11 will not rise to the same height as before since less static pressure is required on the upper side of the diaphragm to close off the valve. In other words, the increased force from the spring 36 takes the place of a portion of the head of fluid acting on the top of the diaphragm 27. Therefore, by screwing down on the screw 37, the liquid level 11 may be maintained at a lower position.

Conversely, by backing off the screw 37 to relieve some of the force exerted by the compression spring 36, a greater level 11 of water in the tank will be necessary to act on the upper part of the diaphragm 27 in combination with the spring pressure to close down the valve. Therefore, the tank level will be increased. It should be noted that in any event, the force exerted by the spring 36 should be sufficient to hold the valve closed against the incoming water pressure when the forces exerted on each side of the diaphragm 27 are equal, the head of water in the upstanding pipe 38 at the level 40 being sufficient together with the natural water pressure within the conduit 21 to open the valve in the absence of water in the tank. It is to be noted that if the compression spring 36 is so adjusted that the valve will be closed when the static pressures on either side of the diaphragm 27 are exactly equal, the tank must necessarily fill to the top of the upstanding pipe 38 in order that the height of the two columns of water in the tank and the pipe respectively, are equal. It should also be noted, as described previously, that as the column of water in the pipe 38 is siphoned out, the head pressure P is effectively increased, thereby insuring positive closure of the valve.

In the event the diaphragm should break, the level 11 of the water in the tank will equalize with the level 40 in the upstanding pipe, but the spring 36 will still exert sufficient force to hold the valve closed.

It is to be noted that the valve body 22 may be made extremely compact and rugged and cast from a single integral metallic or plastic member. Further, the whole apparatus with the exception of the upstanding pipe 38, is submerged at all times under the water and, therefore, is not subject to corrosion through intermittent exposure to the atmosphere. Further, the complete submergence of the valve regulating apparatus of this invention serves to dampen conventional noises associated with the filling of flush tanks whereby reasonably silent operation during the filling of the tank 10 is assured. The device may be easily installed on the bottom of conventional flush tanks, directly over the water source inlet with a minimum of modification to such flush tanks. The heretofore complicated and bulky float valve mechanism may thereby be entirely eliminated. Moreover, the extension handle adjusting means for the spring 36 enables the liquid level in the tank to be maintained at different desired levels.

Modifications of the present apparatus within the scope and spirit of this invention will occur to those skilled in the art. The valve regulating assembly is, therefore, not to be thought of as limited to the specific embodiment chosen for illustrative purposes.

What is claimed is:

1. A valve regulating apparatus for use in a flush tank normally filled to a given level with a liquid, comprising: a body member adapted to be secured to the bottom of said flush tank below said level, said body including a cavity; a diaphragm defining one wall of said cavity and subject to the static pressure of said liquid; valve means in said body communicating with a source of liquid for admitting liquid into said tank; a cylindrical section laterally communicating with said cavity and the underside of said diaphragm, said cylindrical section surrounding said valve means; an upstanding pipe passing from above the level of liquid in the tank down into communication with said cylindrical section, whereby the underside of said diaphragm is subject to a pressure determined by the height of liquid in said pipe; and actuating means responsive to movement of said diaphragm for operating said valve means.

2. An apparatus according to claim 1, in which said actuating means includes a lever arm secured at one end to the center portion of said diaphragm; pivot means secured to said body and connected adjacent the other end of said lever arm, whereby said lever arm is pivoted about said pivot means upon movement of said diaphragm; said valve means including a valve stem coupled to said lever arm whereby said valve means is opened upon an outward movement of said diaphragm in response to a decrease in said static pressure.

3. An apparatus according to claim 2, in which said cylindrical section includes spring means for exerting a biasing force on said valve stem tending to maintain said valve means closed; and means for adjusting said biasing force whereby the differential pressure on said diaphragm necessary to actuate said valve means may be varied and the normal given level to which said tank is filled with liquid, changed.

4. An apparatus according to claim 3, including an overflow fill tube passing from a first level in said upstanding pipe below said given liquid level, to a second level in an overflow pipe, said second level being lower than said first level whereby liquid is siphoned from said upstanding pipe to decrease the pressure exerted on the underside of said diaphragm as a result of the column of liquid in said upstanding pipe.

5. A valve regulating apparatus for use in a flush tank normally filled to a given level with a liquid and including an overflow pipe, comprising: a valve body secured to the bottom of said tank, said valve body including a cavity portion; a diaphragm defining one wall of said cavity portion the outer side of said diaphragm being subject to the static pressure of said liquid at said given level; an upstanding pipe passing from above said given level down into communication with said cavity such that the inner side of said diaphragm is subject to a static pressure determined by the height of liquid in said upstanding pipe; valve means in said body coupled for operation upon movement of said diaphragm and adapted upon opening to admit liquid into said upstanding pipe; biasing means for holding said valve means closed when the static pressure on each side of said diaphragm is equal; and tube means passing from a first level in said upstanding pipe below said given level, to a second level in said overflow pipe, said second level being lower than said first level so that liquid is siphoned from said upstanding pipe to render the static pressure on the inner side of said diaphragm less than the static pressure on the outer side of said diaphragm whereby the differential in the static pressures provides a net force aiding said biasing means for holding said valve means positively closed.

References Cited in the file of this patent

UNITED STATES PATENTS

| | | |
|---|---|---|
| 1,657,658 | Buford | Jan. 31, 1928 |
| 2,442,927 | Horvath | June 8, 1948 |
| 2,685,301 | Dreier | Aug. 3, 1954 |